US012382556B2

(12) United States Patent
Tan et al.

(10) Patent No.: US 12,382,556 B2
(45) Date of Patent: Aug. 5, 2025

(54) DIMMING AND COLOR TEMPERATURE ADJUSTING CONTROL MODULE

(71) Applicant: Dongguan Haiyue Intelligent Technology Co., Ltd, Guangdong (CN)

(72) Inventors: Huishi Tan, Guangdong (CN); Xinmin Chen, Guangdong (CN)

(73) Assignee: Dongguan Haiyue Intelligent Technology Co., Ltd, Dongguan (CN)

( * ) Notice: Subject to any disclaimer, the term of this patent is extended or adjusted under 35 U.S.C. 154(b) by 83 days.

(21) Appl. No.: 18/539,242

(22) Filed: Dec. 13, 2023

(65) Prior Publication Data

US 2024/0422871 A1 Dec. 19, 2024

(30) Foreign Application Priority Data

Jun. 15, 2023 (CN) ........................ 202310715416.0

(51) Int. Cl.

| | |
|---|---|
| ***H05B 45/10*** | (2020.01) |
| ***H05B 45/20*** | (2020.01) |
| ***H05B 45/325*** | (2020.01) |

(52) U.S. Cl.

CPC ............ *H05B 45/10* (2020.01); *H05B 45/20* (2020.01); *H05B 45/325* (2020.01)

(58) Field of Classification Search

CPC ...... H05B 45/10; H05B 45/20; H05B 45/325; H05B 47/19; H05B 47/165; H05B 47/195

See application file for complete search history.

(56) References Cited

U.S. PATENT DOCUMENTS

| | | | | |
|---|---|---|---|---|
| 10,314,124 | B1 * | 6/2019 | Yang ...................... | H05B 45/20 |
| 2019/0191522 | A1 * | 6/2019 | Johnson ................. | H05B 47/19 |
| 2020/0363043 | A1 * | 11/2020 | Stegeman ............... | F21S 8/086 |

* cited by examiner

*Primary Examiner* — Minh Tran

(57) ABSTRACT

Disclosed is a dimming and color temperature adjusting control module, including a PWM-to-0-10V dimming circuit, a MUC main control circuit, an infrared receiving circuit, a power supply circuit, a wireless communication module, an output interface circuit, and a color temperature conversion driving circuit. Corresponding terminals of the MUC main control circuit are electrically connected to corresponding terminals of the PWM-to-0-10V dimming circuit, the infrared receiving circuit, the wireless communication module, the output interface circuit and the color temperature conversion driving circuit, respectively.

7 Claims, 16 Drawing Sheets

DIMMING AND COLOR TEMPERATURE ADJUSTING CONTROL MODULE

CROSS REFERENCE TO RELATED APPLICATIONS

The present application claims the benefit of Chinese Patent Application No. 202310715416.0 filed on Jun. 15, 2023, the contents of which are incorporated herein by reference in their entirety.

FIELD OF TECHNOLOGY

The present disclosure relates to the technical field of LED (light-emitting diode) light boards, and in particular to a dimming and color temperature adjusting control module.

BACKGROUND

The existing dimming and color temperature adjusting circuits basically use dimming circuits and color temperature adjusting circuits independently, and each functional structural block is used independently, and thus the compatible use cannot be achieved. The circuits need different circuit connection modes for use, and the control can be manually adjusted by using switches, so it is impossible to achieve remote and wireless adjustment, or to manually adjust the brightness of the driving output independently, or to manually adjust the color temperature of the light-emitting diode (LED) light board. Moreover, after the LED lamp is hung, the adjustment of the brightness and color temperature can be set after the LED lamp reaches a certain height by means of certain auxiliary tools, which is basically useless for a terminal user. Therefore, a further improvement is needed.

SUMMARY

For the problems in the prior art, a dimming and color temperature adjusting control module is provided. According to the dimming and color temperature adjusting control module, the remote control of dimming and color temperature adjusting can be achieved by unplugging an interface terminal cover on an LED power supply and plugging a novel dimming and color temperature adjusting control module, thus achieving plug-and-play, and meanwhile, a shared mobile phone APP is provided for the setting of demands, such that a terminal user can achieve the dimming and color temperature adjusting of an LED lamp. meanwhile, the module and interface become standardized, which is convenient for production and maintenance.

In order to achieve the objective above, a dimming and color temperature adjusting control module is provided, including a pulse width modulation (PWM)-to-0-10V dimming circuit, a microcontroller unit (MUC) main control circuit, an infrared receiving circuit, a power supply circuit, a wireless communication module, an output interface circuit, a color temperature conversion driving circuit, and an auxiliary power supply circuit.

Corresponding terminals of the MUC main control circuit are electrically connected to corresponding terminals of the PWM-to-0-10V dimming circuit, the infrared receiving circuit, the wireless communication module, and the color temperature conversion driving circuit, respectively.

A corresponding terminal of the color temperature conversion driving circuit is electrically connected to a corresponding terminal of the output interface circuit.

The power supply circuit is configured to output a voltage of 3.3 V, so as to supply power to the MUC main control circuit, the wireless communication module and the infrared receiving circuit.

The auxiliary power supply circuit is configured to output a voltage of 12 V, so as to supply power to the color temperature conversion driving circuit.

The MUC main control circuit includes a CMS8S6990N chip and a peripheral circuit thereof.

Preferably, the PWM-to-0-10V dimming circuit includes a resistor R16, a resistor R15, a resistor R32, a resistor R30, a resistor R34, a resistor R35, a resistor R37, a resistor R38, a resistor R41, a capacitor C11, a capacitor C16, a capacitor C18, a capacitor C48, a capacitor C23, a triode Q15, and an operational amplifier LM321. A positive electrode of the operational amplifier LM321 is electrically connected to one terminal of the resistor R34, one terminal of the resistor R37, and one terminal of the capacitor C16. A negative electrode of the operational amplifier LM321 is electrically connected to the other terminal of the capacitor C16, one terminal of the resistor R15, one terminal of the capacitor C48, and one terminal of the resistor R38, respectively. An output of the operational amplifier LM321 is electrically connected to one terminal of the capacitor C11, one terminal of the capacitor C18, and a first terminal of the triode Q15 via one terminal of the resistor R32, respectively. A fifth terminal of the operational amplifier LM321 is electrically connected to one terminal of the resistor R41 and one terminal of the capacitor C23, respectively, and the other terminal of the capacitor C23 and the other terminal of the resistor R34 are grounded. The other terminal of the resistor R37 is electrically connected to one terminal of the resistor R35 and a second terminal of the triode Q15, respectively, and the other terminal of the resistor R15 is electrically connected to the other terminal of the capacitor C18. The other terminal of the capacitor C48 is electrically connected to one terminal of the resistor R30 and a third terminal of the triode Q15 respectively and is grounded; the other terminal of the resistor R30 is electrically connected to the other terminal of the resistor R38 and one terminal of the resistor R16, respectively, the other terminal of the resistor R16 is electrically connected to a corresponding terminal of the CMS8S6990N chip, and the other terminal of the resistor R35 is electrically connected to the other terminal of the capacitor C11.

Preferably, the power supply circuit includes a voltage regulator chip ME6209 and a peripheral circuit thereof, which is configured to convert an input voltage of 12 V into 3.3 V, so as to supply power to the MUC main control circuit, the wireless communication module and the infrared receiving circuit.

Preferably, the auxiliary power supply circuit includes a flyback control chip JW3510, a transformer, a resistor R1, a resistor R2, a resistor R3, a resistor R8, a resistor R50, a capacitor C1, a capacitor C5, a capacitor C6, a capacitor C7, a capacitor C8, a diode D1, a diode D2, and an inductor F1. One terminal of the inductor F1 is connected to a 12V-AUX terminal, and the other terminal of the inductor FI is electrically connected to one terminal of the capacitor C7, one terminal of the resistor R1, a fifth terminal of the flyback control chip JW3510, one terminal of the capacitor C1, one terminal of the resistor R2, and one terminal of the transformer, respectively. The other terminal of the capacitor C7 is electrically connected to one terminal of the resistor R3, a second terminal of the flyback control chip JW3510 and one terminal of the capacitor C8, respectively. The other terminal of the resistor R1 is electrically connected to a first terminal of the flyback control chip JW3510 and the other terminal of the resistor R3, respectively. A fourth terminal of the flyback control chip JW3510 is electrically connected to one terminal of the diode D1, a corresponding terminal of the transformer, and one terminal of the resistor R8, respectively. The other terminal of the diode D1 is electrically connected to the other terminal of the capacitor C1, and the other terminal of the resistor R2. A third terminal of the flyback control chip JW3510 is electrically connected to the other terminal of the capacitor C8, and the other terminal of the resistor R8, respectively. The corresponding terminals of the transformer are electrically connected to one terminal of the diode D2, one terminal of the capacitor C5, one terminal of the capacitor C6, and one terminal of the resistor R50, respectively, and the other terminal of the diode D2 is electrically connected to the other terminal of the capacitor C5, the other terminal of the capacitor C6, and the other terminal of the resistor R50.

Preferably, the color temperature conversion driving circuit includes a MOS (metal oxide semiconductor) transistor Q2, a MOS transistor Q5, a triode Q1, a triode Q3, a triode Q4, a triode Q6, a phototriode I, a phototriode II, a diode ZD2, a diode ZD3, a resistor R13, a resistor R14, a resistor R17, a resistor R18, a resistor R20, a resistor R21, a resistor R23, a resistor R24, a resistor R25, a resistor R26, a resistor R27, a resistor R28, a resistor R29, a resistor R31, and a capacitor C22.

A gate of the MOS transistor Q2 is electrically connected to one terminal of the resistor R17, one terminal of the resistor R23, one terminal of the diode ZD2 and one terminal of the resistor R25, respectively, and a source of the MOS transistor Q2 is electrically connected to the other terminal of the resistor R25, the other terminal of the diode ZD2, a first terminal of the triode Q3, a first terminal of the triode Q6, one terminal of the diode ZD3, one terminal of the resistor R24 and a source of the MOS transistor Q5, respectively. The other terminal of the resistor R23 is electrically connected to a corresponding terminal of the output interface circuit and one terminal of the resistor R27 via the resistor R29 and the resistor R26, respectively. The other terminal of the resistor R17 is electrically connected to a first terminal of the triode Q1 and a second terminal of the triode Q3, respectively. A second terminal of the triode Q1 is electrically connected to one terminal of the resistor R18 and a third terminal of the transistor Q3, respectively, and a third terminal of the triode Q1 is electrically connected to one terminal of the resistor R13, one terminal of the capacitor C22, one terminal of the phototriode I, and one terminal of the phototriode II via the resistor R14, respectively. The other terminal of the resistor R18 is electrically connected to the other terminal of the phototriode I, and the other terminal of the phototriode II is electrically connected to a first terminal of the triode Q4 and a second terminal of the triode Q6 via the resistor R21, respectively. A gate of the MOS transistor Q5 is electrically connected to one terminal of the resistor R28, one terminal of the resistor R20, the other terminal of the diode ZD3 and the other terminal of the resistor R24, respectively. The other terminal of the resistor R20 is electrically connected to a second terminal of the triode Q4 and a third terminal of the triode Q6, respectively. A third terminal of the triode Q4 is electrically connected to the other terminal of the resistor R13, and the other terminal of the resistor R28 is electrically connected to the other terminal of the resistor R27 via the resistor R31.

Preferably, the wireless communication module is one of a wireless Bluetooth module, a WIFI module, a 2G module, a 3G module, a 4G module, and a 5G module.

The present disclosure adopting the technical solution has the following beneficial effects: the module with the function of remotely controlling dimming and color temperature adjusting is compatible with an inductive dimming module in the market, which can rapidly achieve the dimming and color temperature control of an LED-driven lamp in an alternate way. Correspondingly, the LED driver needs to reserve a color temperature driving interface and a color temperature conversion driving circuit. A single-chip microcomputer is used for intelligent control of brightness and color temperature adjustment, which can be used for long-distance control or remote wireless control. The long-distance control includes an infrared remote control (RF), and the remote wireless control includes a Bluetooth remote control and a WiFi remote control. The single-chip microcomputer can be configured to adjust the corresponding brightness and color temperature according to received remote control information. The dimming and color temperature adjusting module is upgraded from a standard inductor in the current market, which makes a customer have another choice between dimming and color temperature adjusting. Meanwhile, the modules and interfaces become standardized, thus facilitating production and maintenance.

DESCRIPTION OF THE EMBODIMENTS

Figure 1:
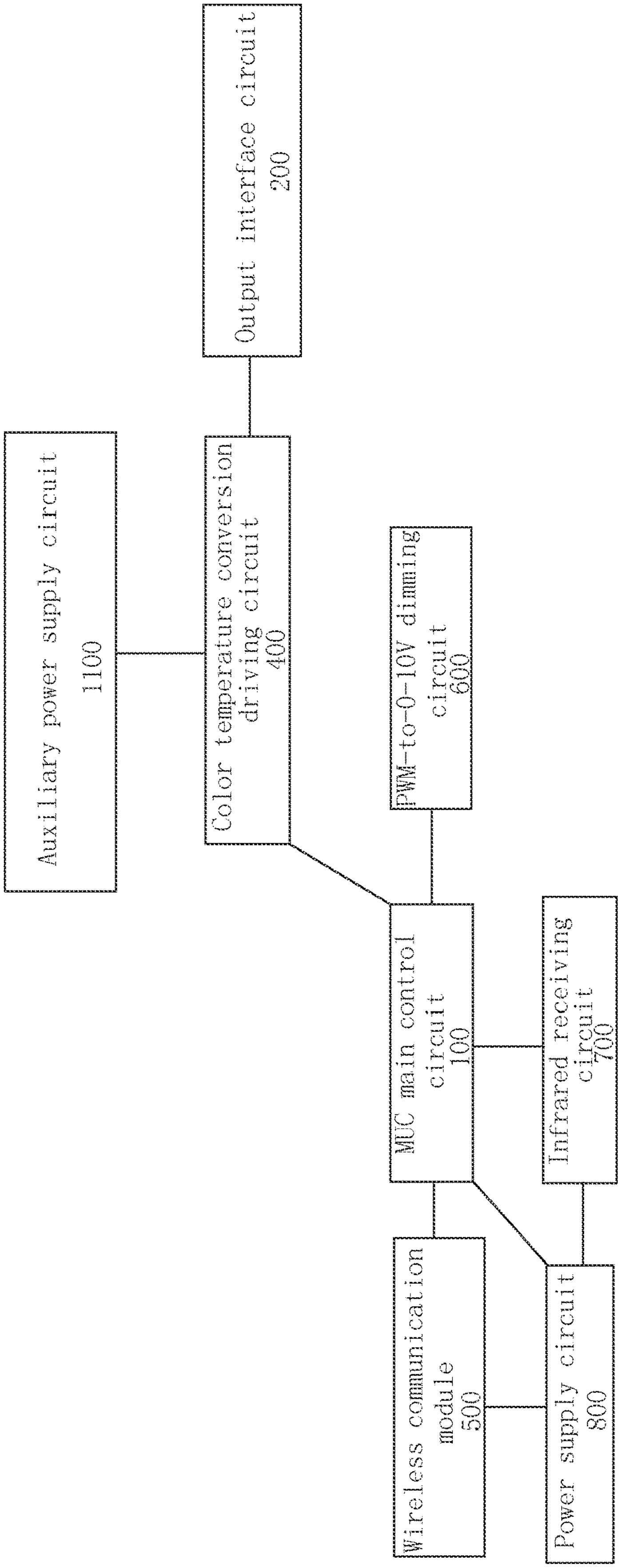
FIG. 1 is a schematic diagram of a control module according to the present disclosure.

The present disclosure is further described below with reference to accompanying drawings and specific embodiments.

Embodiment 1

Referring to FIG. 1 through FIG. 10, a dimming and color temperature adjusting control module is provided by the present disclosure, including a PWM-to-0-10V dimming circuit 600, a MUC main control circuit 100, an infrared receiving circuit 700, a power supply circuit 800, a wireless communication module 500, an output interface circuit 200, a color temperature conversion driving circuit 400, and an auxiliary power supply circuit 1100.

Corresponding terminals of the MUC main control circuit 100 are electrically connected to corresponding terminals of the PWM-to-0-10V dimming circuit 600, the infrared receiving circuit 700, the wireless communication module 500, and the color temperature conversion driving circuit, respectively.

The corresponding terminal of the color temperature conversion driving circuit 400 is electrically connected to a corresponding terminal of the output interface circuit 200.

The power supply circuit 800 is configured to output a voltage of 3.3 V, so as to supply power to the MUC main control circuit, the wireless communication module and the infrared receiving circuit.

The auxiliary power supply circuit 1100 is configured to output a voltage of 12 V, so as to supply power to the color temperature conversion driving circuit.

Figure 2:
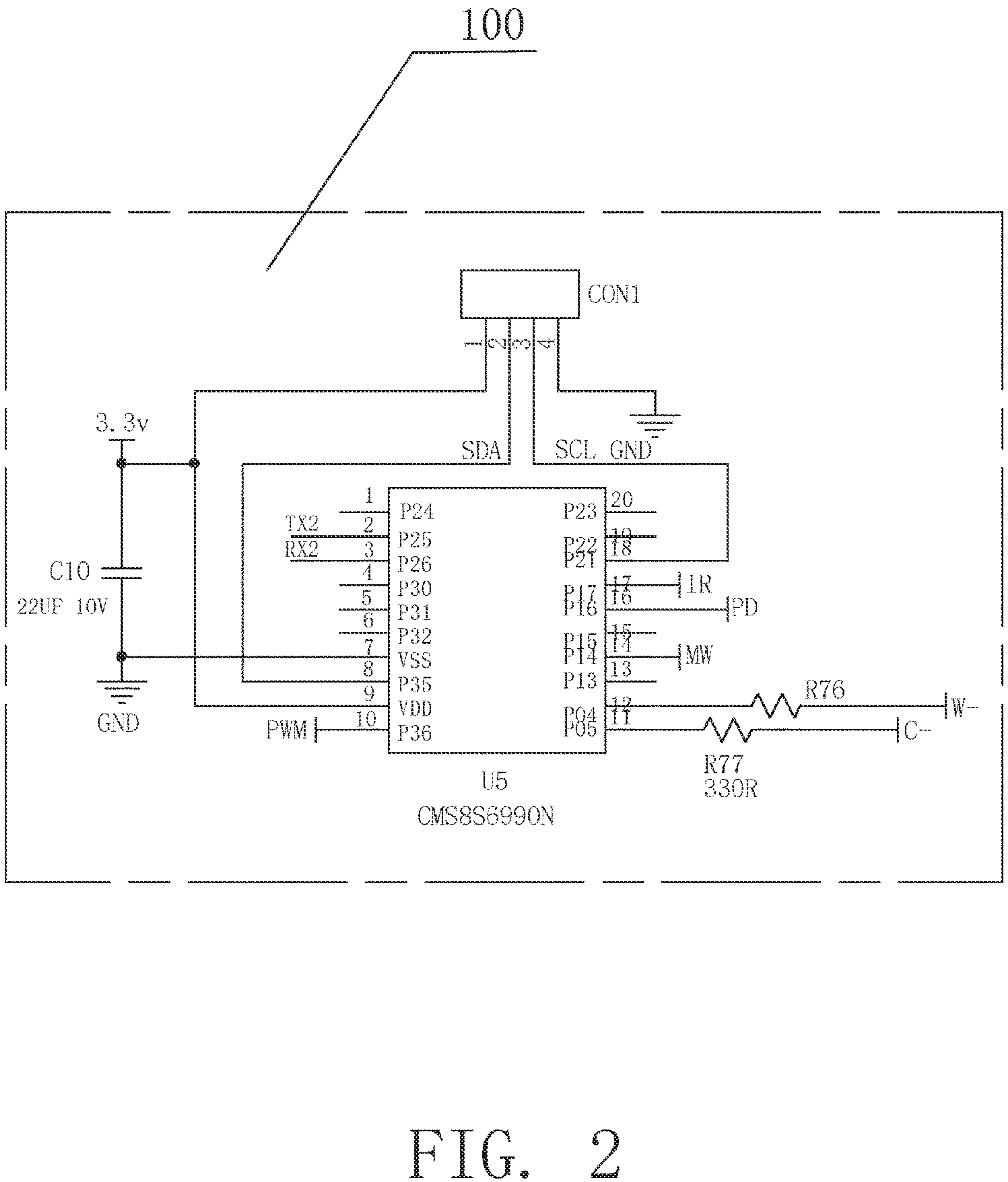
FIG. 2 is a schematic diagram of a MUC main control circuit according to the present disclosure.

Referring to FIG. 2, the MUC main control circuit 100 in this embodiment is a single-chip microcomputer CMS8S6990N, CON1 is a burning PIN connected to a pin 9 VDD, a pin 8 SDA, and a pin 18 SCL, and a ground pin GND. 10 is the PWM output for adjusting the power of LED driver, i.e., dimming. Three levels, i.e., 0&1, 1&0 and 1&1, are output by a pin 12 W− and a pin 11 C− for driving an optocoupler, so as to achieve color temperatures of 3000 K, 5000 K and 4000 K under the action of the color temperature conversion driving circuit. A pin 2 TX2 and a pin 3 RX2 are configured to receive and decode RXTX serial communication signals transmitted from a Bluetooth module, so as to achieve wireless communication. Meanwhile, a pin 17 is reserved as an IR infrared input interface for receiving and decoding an infrared signal, a pin 16 is a light-sensing input for preferably processing light complementation and light sensing. A pin 14 MW is a microwave induction input for processing a microwave induction signal. The MUC main control circuit includes a CMS8S6990N chip and a peripheral circuit thereof.

Figure 3:
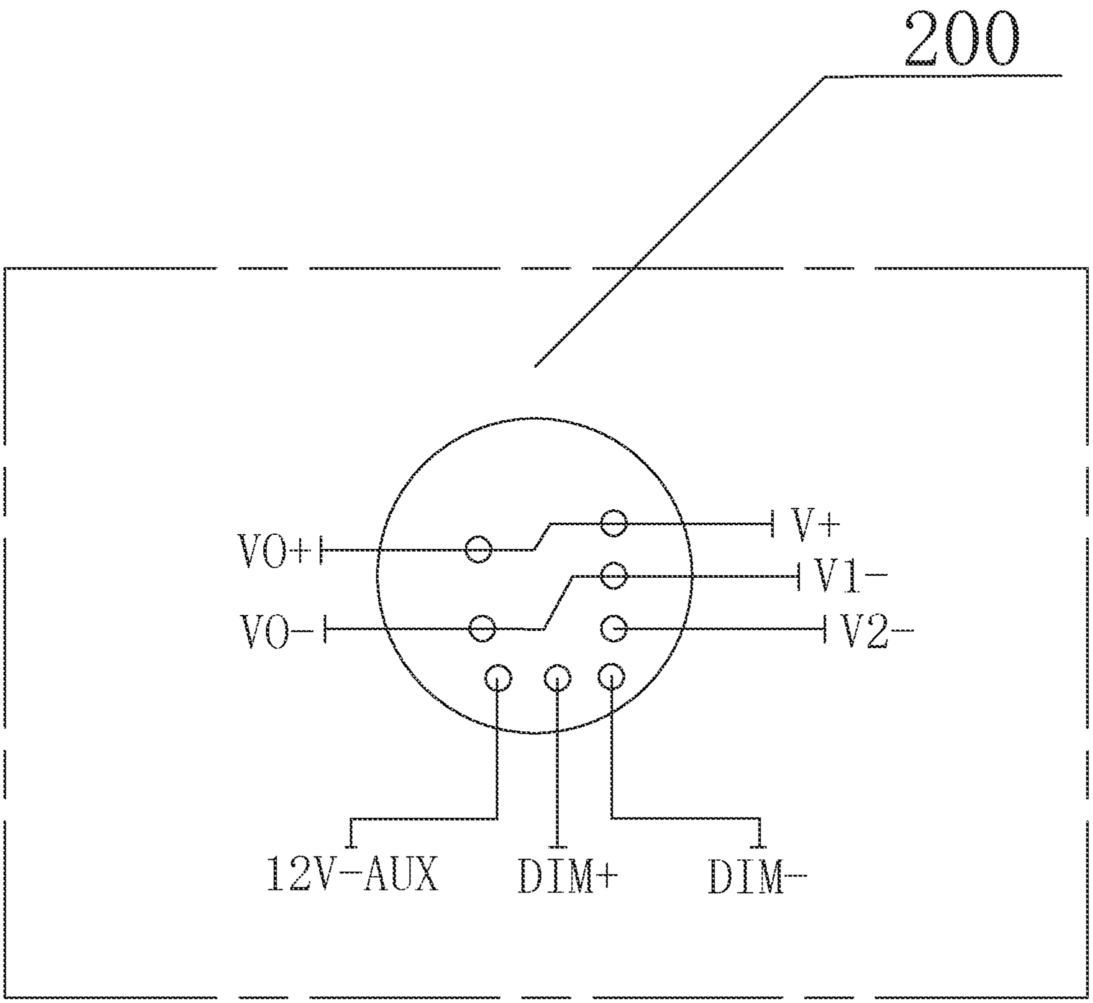
FIG. 3 is a schematic diagram of an output interface circuit according to the present disclosure.

Referring to FIG. 3, the function of the output interface circuit 200 in this embodiment is used only for the insertion of a short connector instead of a color temperature adjusting and power adjusting module when the customer does not require color temperature adjusting and power adjusting. V+ and V1− are normally output, and the color temperature adjusting and power adjusting can be remotely controlled when the short connector is replaced with a novel color temperature adjusting and power adjusting module.

Figure 4:
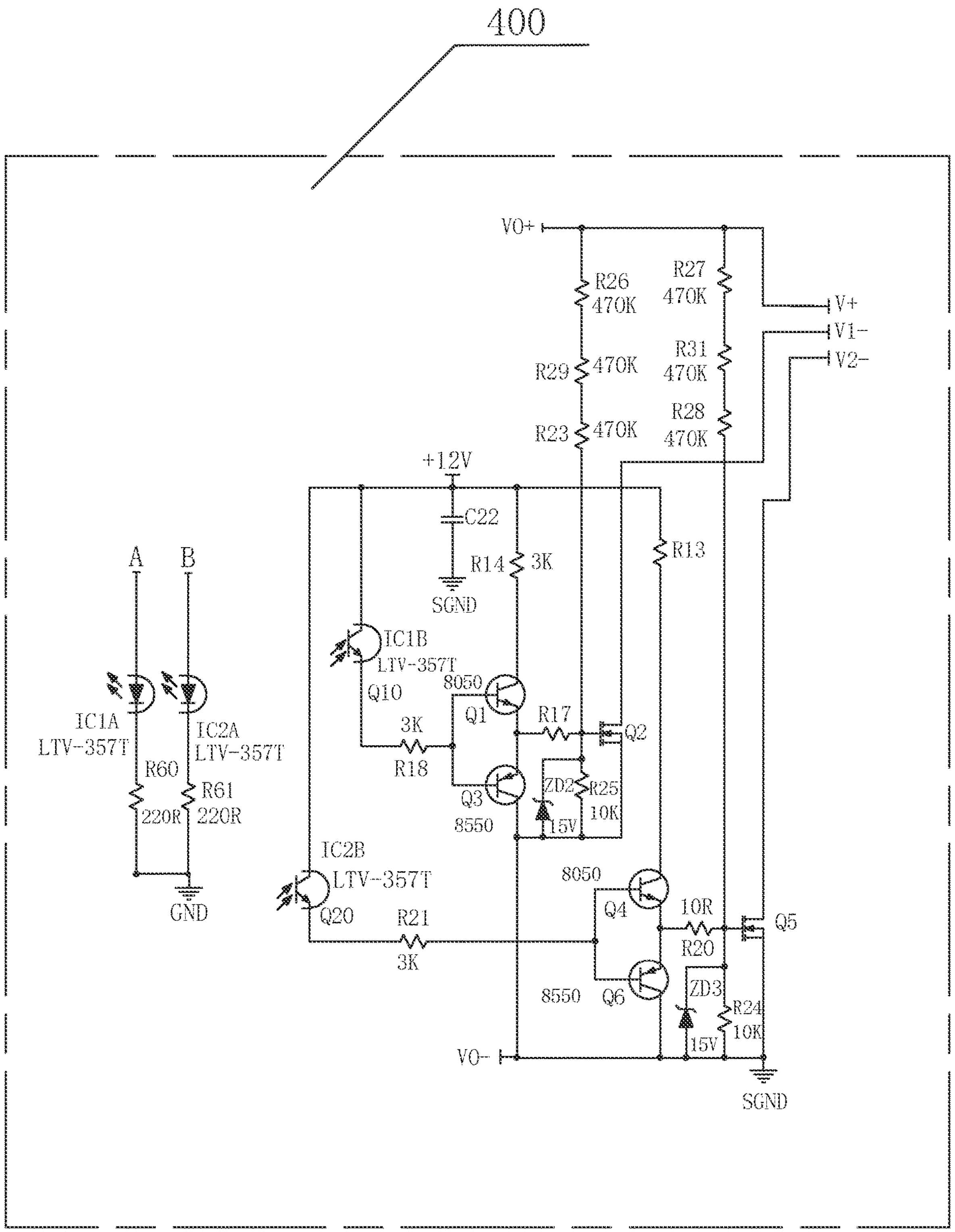
FIG. 4 is a schematic circuit diagram of a color temperature conversion driving circuit according to the present disclosure.

Referring to FIG. 4, the color temperature conversion driving circuit 400 in this embodiment is composed of a metal oxide semiconductor (MOS) Q2 and a MOS Q5 and driving circuits thereof. Q1 and Q3 form a TTL drive to rapidly turn on and off Q2, a driving signal is provided by an optocoupler IC1, and a logic of the signal is transmitted from a pin B of the MCU according to a received instruction. Q4 and Q6 form a TTL drive to rapidly turn on and off the Q5, a driving signal is provided by the optocoupler IC1, and the logic of the signal is transmitted from a pin A of the MCU according to a received instruction. The color temperature conversion driving circuit includes a MOS transistor Q2, a MOS transistor Q5, a triode Q1, a triode Q3, a triode Q4, a triode Q6, a phototriode I, a phototriode II, a diode ZD2, a diode ZD3, a resistor R13, a resistor R14, a resistor R17, a resistor R18, a resistor R20, a resistor R21, a resistor R23, a resistor R24, a resistor R25, a resistor R26, a resistor R27, a resistor R28, a resistor R29, a resistor R31, and a capacitor C22.

A gate of the MOS transistor Q2 is electrically connected to one terminal of the resistor R17, one terminal of the resistor R23, one terminal of the diode ZD2, and one terminal of the resistor R25, respectively and a source of the MOS transistor Q2 is electrically connected to the other terminal of the resistor R25, the other terminal of the diode ZD2, a first terminal of the triode Q3, a first terminal of the triode Q6, one terminal of the diode ZD3, one terminal of the resistor R24 and a source of the MOS transistor Q5, respectively. The other terminal of the resistor R23 is electrically connected to a corresponding terminal of the output interface circuit and one terminal of the resistor R27 via the resistor R29 and the resistor R26, respectively. The other terminal of the resistor R17 is electrically connected to a first terminal of the triode Q1 and a second terminal of the triode Q3, respectively. A second terminal of the triode Q1 is electrically connected to one terminal of the resistor R18 and a third terminal of the transistor Q3, respectively, and a third terminal of the triode Q1 is electrically connected to one terminal of the resistor R13, one terminal of the capacitor C22, one terminal of the phototriode I, and one terminal of the phototriode II via the resistor R14, respectively. The other terminal of the resistor R18 is electrically connected to the other terminal of the phototriode I, and the other terminal of the phototriode II is electrically connected to a first terminal of the triode Q4 and a second terminal of the triode Q6 via the resistor R21, respectively. A gate of the MOS transistor Q5 is electrically connected to one terminal of the resistor R28, one terminal of the resistor R20, the other terminal of the diode ZD3 and the other terminal of the resistor R24, respectively. The other terminal of the resistor R20 is electrically connected to a second terminal of the triode Q4 and a third terminal of the triode Q6, respectively. A third terminal of the triode Q4 is electrically connected to the other terminal of the resistor R13, and the other terminal of the resistor R28 is electrically connected to the other terminal of the resistor R27 via the resistor R31.

Figure 5:
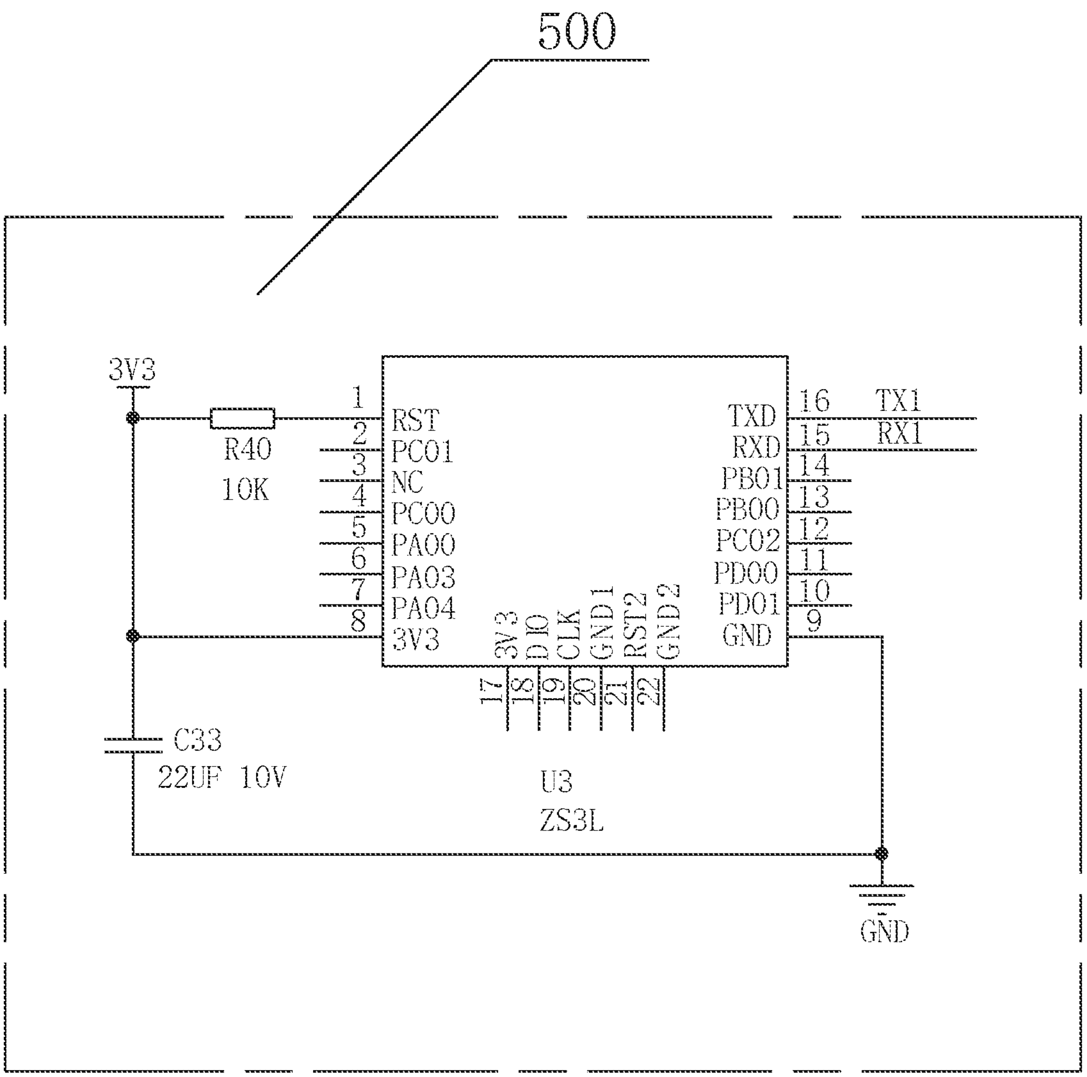
FIG. 5 is a schematic circuit diagram of a wireless communication module according to the present disclosure.

Referring to FIG. 5, the wireless communication module 500 in this embodiment is a wireless Bluetooth module. A chip of the wireless Bluetooth module is ZS3L U3. After a pin 8 is powered with 3.3V, R40 is reset, and an IC module enters into operation. After matching with a mobile phone APP, serial communications RX and TX communicate with the MCU to achieve wireless remote-control setting. The wireless communication module is one of a wireless Bluetooth module, a WIFI module, a 2G module, a 3G module, a 4G module and a 5G module.

Figure 6:
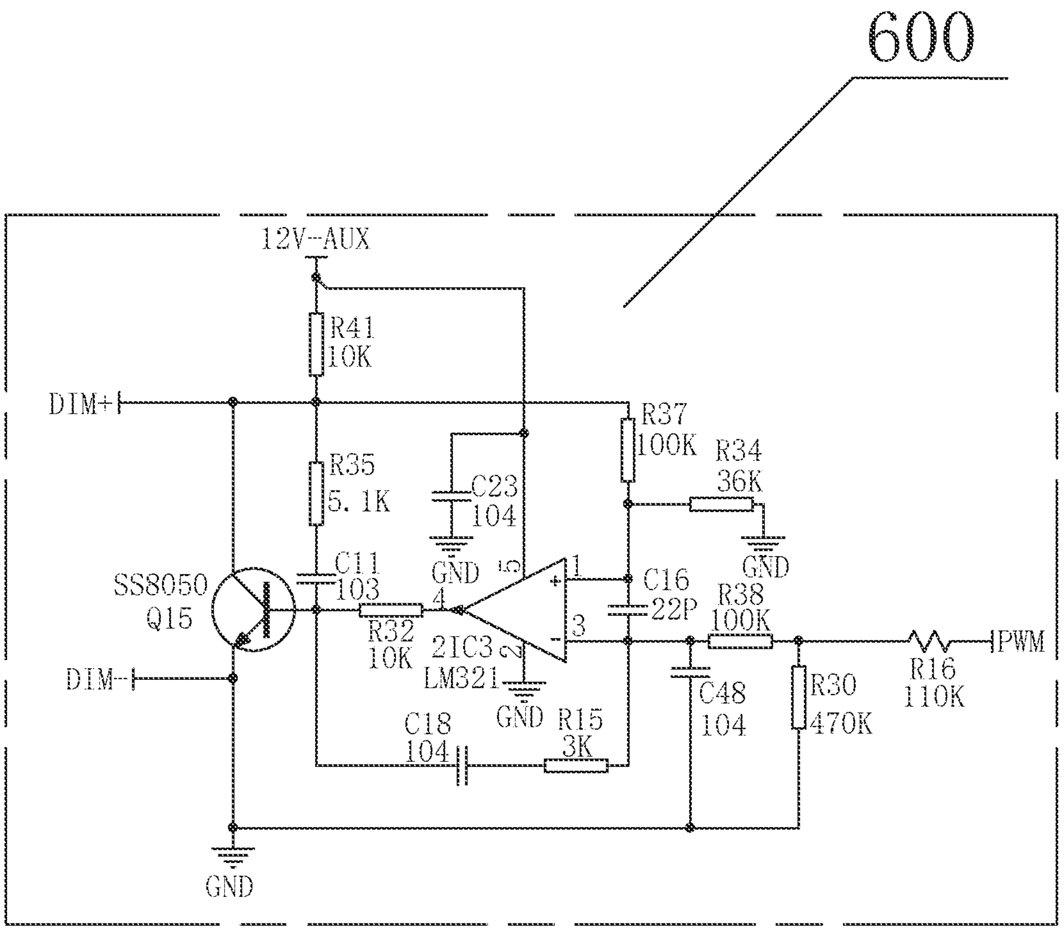
FIG. 6 is a schematic circuit diagram of a PWM-to-0-10V dimming circuit according to the present disclosure.

Referring to FIG. 6, the PWM-to-0-10V dimming circuit 600 is as follows: a pulse with an adjustable duty ratio of 0-100% output by 3.3 V is divided into 2.5V via R16 and R30 and sent to a pin 3 of 2IC3 LM321. LM321 is linearly amplified by 4 times via R37 and R34, and an analog voltage of 0-10V is output at a pin 4 to push Q15 to pull DIM+, that is, a dimming voltage of a LED driver may vary from 0 V to 10 V, so as to achieve dimming and power adjusting. The PWM-to-0-10V dimming circuit includes a resistor R16, a resistor R15, a resistor R32, a resistor R30, a resistor R34, a resistor R35, a resistor R37, a resistor R38, a resistor R41, a capacitor C11, a capacitor C16, a capacitor C18, a capacitor C48, a capacitor C23, a triode Q15, and an operational amplifier LM321. A positive electrode of the operational amplifier LM321 is electrically connected to one terminal of the resistor R34, one terminal of the resistor R37, and one terminal of the capacitor C16, respectively. A negative electrode of the operational amplifier LM321 is electrically connected to the other terminal of the capacitor C16, one terminal of the resistor R15, one terminal of the capacitor C48 and one terminal of the resistor R38, respectively. An output of the operational amplifier LM321 is electrically connected to one terminal of the capacitor C11, one terminal of the capacitor C18, and a first terminal of the triode Q15 via one terminal of the resistor R32, respectively. A fifth terminal of the operational amplifier LM321 is electrically connected to one terminal of the resistor R41 and one terminal of the capacitor C23, respectively, and the other terminal of the capacitor C23 and the other terminal of the resistor R34 are grounded. The other terminal of the resistor R37 is electrically connected to one terminal of the resistor R35 and a second terminal of the triode Q15, respectively, and the other terminal of the resistor R15 is electrically connected to the other terminal of the capacitor C18. The other terminal of the capacitor C48 is electrically connected to one terminal of the resistor R30 and a third terminal of the triode Q15 respectively and is grounded; the other terminal of the resistor R30 is electrically connected to the other terminal of the resistor R38 and one terminal of the resistor R16, respectively, the other terminal of the resistor R16 is electrically connected to a corresponding terminal of the CMS8S6990N chip, and the other terminal of the resistor R35 is electrically connected to the other terminal of the capacitor C11.

Figure 7:
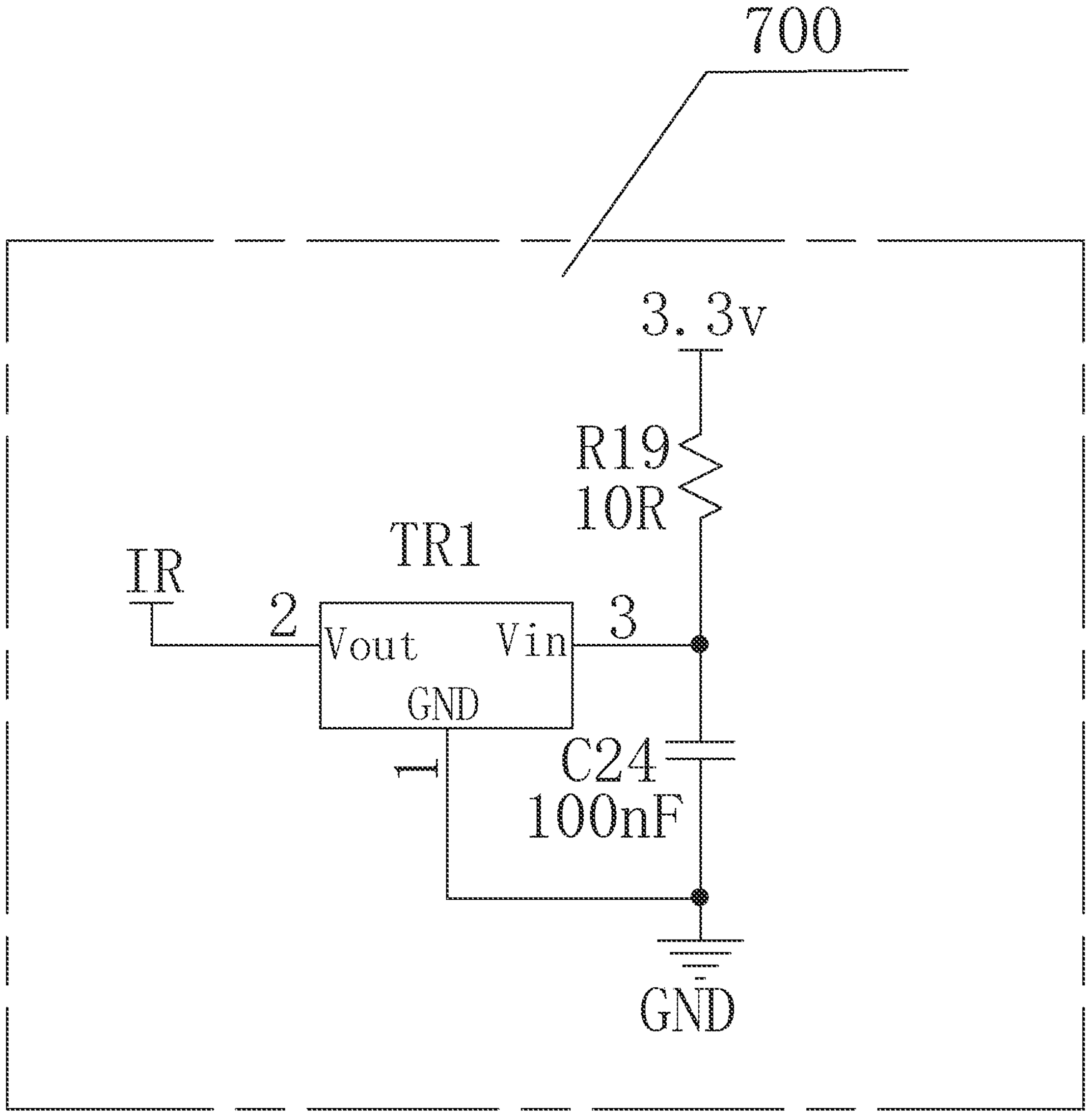
FIG. 7 is a circuit schematic diagram of an infrared receiving circuit according to the present disclosure.

Referring to FIG. 7, the function of the infrared receiving circuit 700 in this embodiment is to receive an infrared signal transmitted from an infrared remote controller, and to transmit the infrared signal to a pin 16 of the MUC via the pin 2 for value-building decoding processing, and the pin 3 is Vin which is configured to supply power to an infrared receiving module after the filtration of C24.

Figure 8:
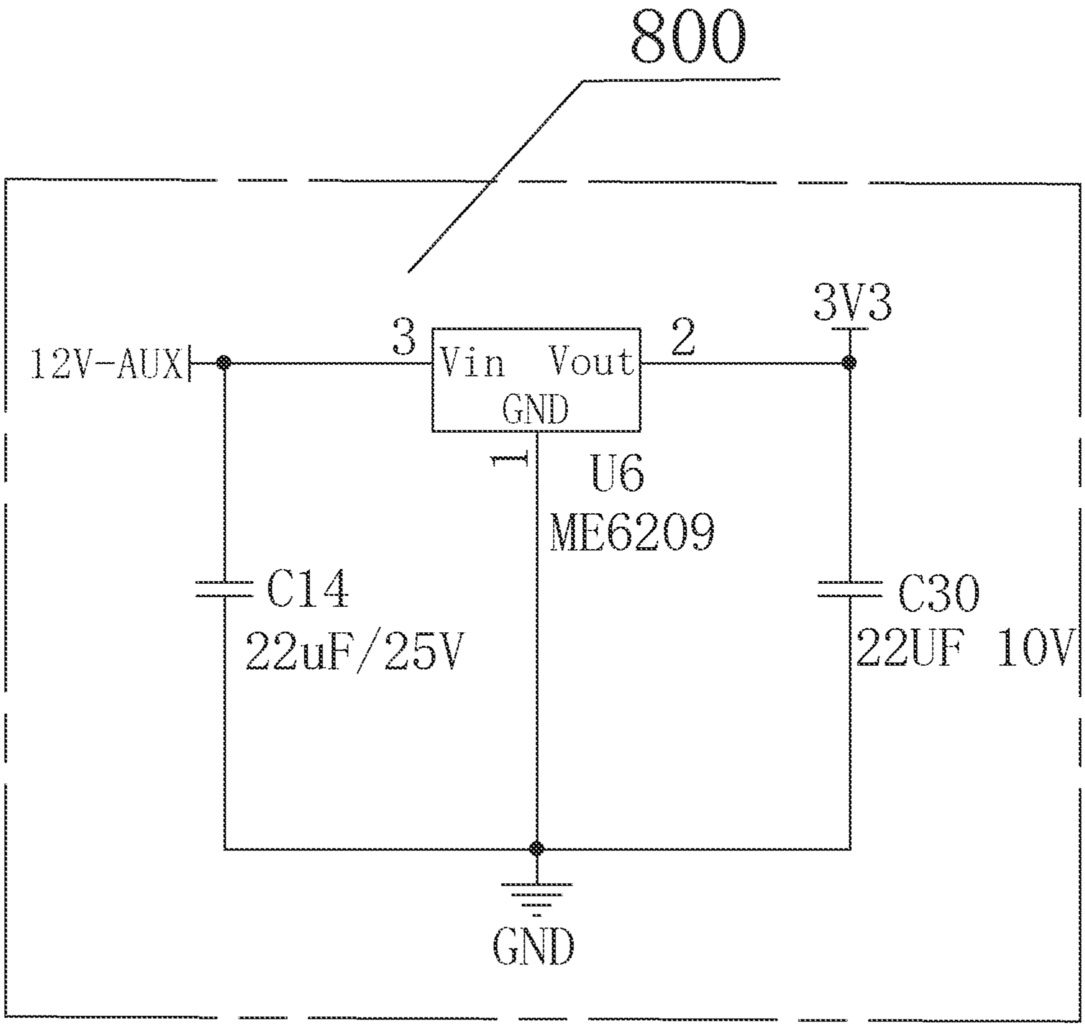
FIG. 8 is a schematic circuit diagram of a power supply circuit according to the present disclosure.

Referring to FIG. 8, the power supply circuit 800 in this embodiment further includes a resistor R19 and a capacitor C14. 12-AUX is reduced to 3.3 V via U6 ME6209 after being is filtered via the C14, and then is filtered via C30, so as to provide stable power supply for the MCU and the Bluetooth module. The power supply circuit includes a voltage regulator chip ME6209 and a peripheral circuit thereof, which are configured to convert an input voltage of 12 V into 3.3 V, so as to supply power to the circuit.

Figure 9:
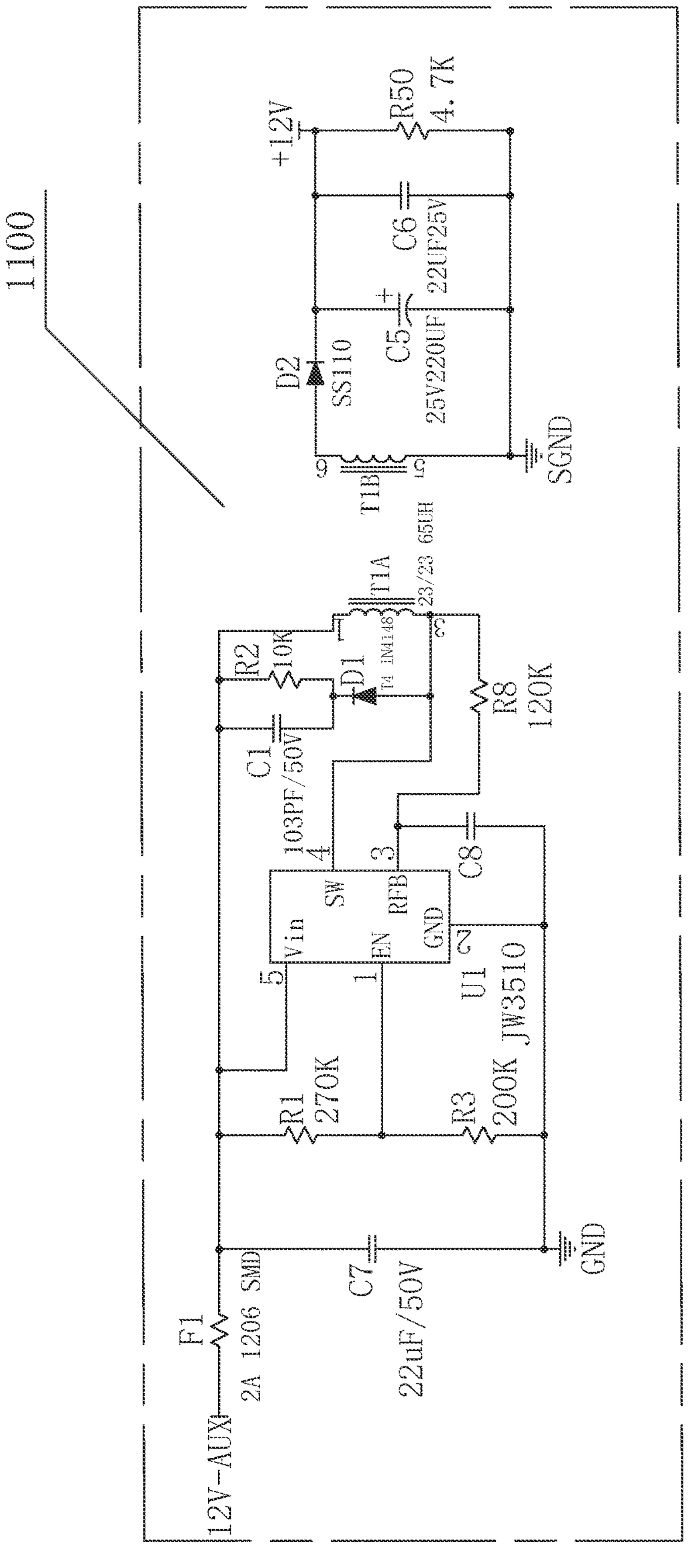
FIG. 9 is a schematic diagram of an auxiliary power supply circuit according to the present disclosure.
Figure 10:
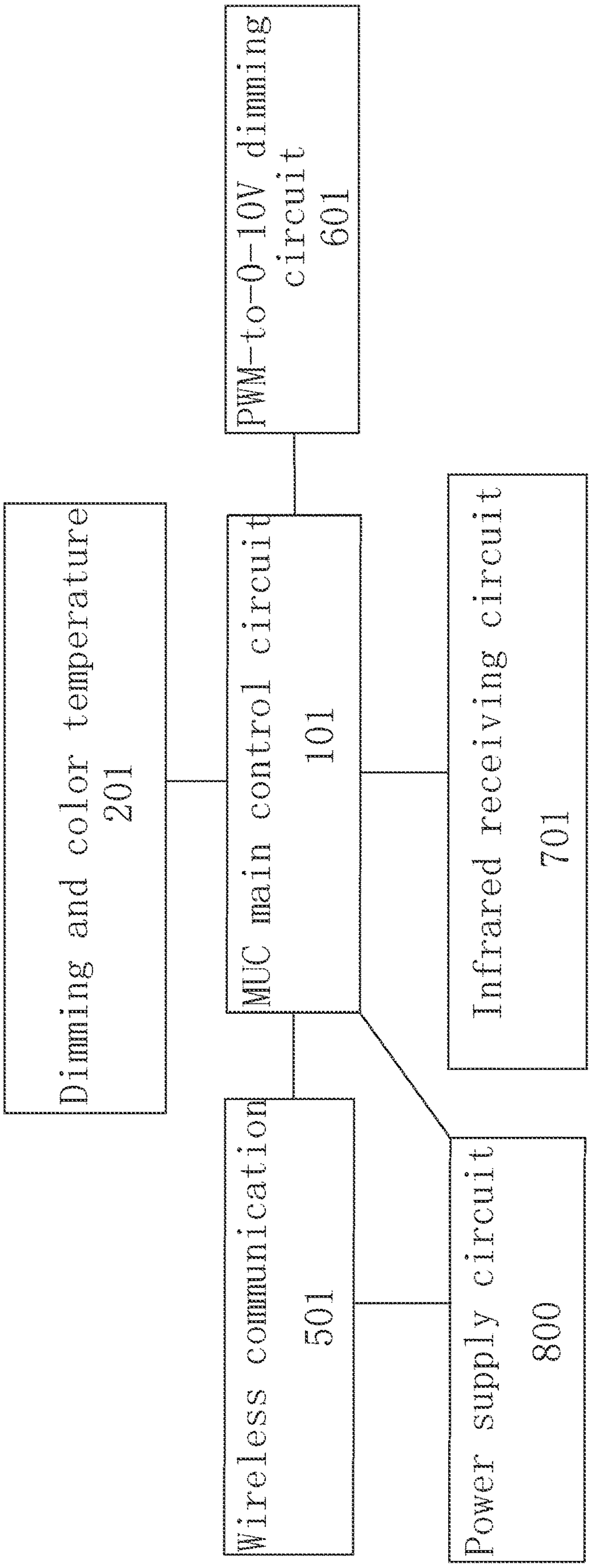
FIG. 10 is a schematic diagram of a control module according to Embodiment 2 of the present disclosure.

Referring to FIG. 9, the function of the auxiliary power supply circuit in this embodiment is to convert an auxiliary voltage of 10-15 V provided by an LED into a stable and isolated output voltage of 12 V, so as to supply power to the color temperature conversion driving circuit. The auxiliary power supply circuit is mainly composed of a transformer T1 and a flyback control IC U1 JW3510 with built-in MOS. When a set voltage of R1 and R3 is less than 7 V, U1 is turned off, and when the set voltage of R1 and R3 is higher than 7 V, the U1 operates normally, a pin 5 is used to supply power to Vin, SW is a drain D with a built-in MOS, and R8 sets an output to be 12 V according to the feedback RFB. D1, C1 and R2 form an RCD spike absorption circuit, and D2 and C5 form a secondary isolated output of 12 V. The auxiliary power supply circuit includes a flyback control chip JW3510, a transformer, a resistor R1, a resistor R2, a resistor R3, a resistor R8, a resistor R50, a capacitor C1, a capacitor C5, a capacitor C6, a capacitor C7, a capacitor C8, a diode D1, a diode D2, and an inductor F1. One terminal of the inductor F1 is connected to a 12V-AUX terminal, and the other terminal of the inductor F1 is electrically connected to one terminal of the capacitor C7, one terminal of the resistor R1, a fifth terminal of the flyback control chip JW3510, one terminal of the capacitor C1, one terminal of the resistor R2, and one terminal of the transformer, respectively. The other terminal of the capacitor C7 is electrically connected to one terminal of the resistor R3, a second terminal of the flyback control chip JW3510 and one terminal of the capacitor C8, respectively. The other terminal of the resistor R1 is electrically connected to a first terminal of the flyback control chip JW3510 and the other terminal of the resistor R3, respectively. A fourth terminal of the flyback control chip JW3510 is electrically connected to one terminal of the diode D1, a corresponding terminal of the transformer, and one terminal of the resistor R8, respectively. The other terminal of the diode D1 is electrically connected to the other terminal of the capacitor C1, and the other terminal of the resistor R2, respectively. A third terminal of the flyback control chip JW3510 is electrically connected to the other terminal of the capacitor C8, and the other terminal of the resistor R8, respectively. The corresponding terminals of the transformer are electrically connected to one terminal of the diode D2, one terminal of the capacitor C5, one terminal of the capacitor C6, and one terminal of the resistor R50, respectively, and the other terminal of the diode D2 is electrically connected to the other terminal of the capacitor C5, the other terminal of the capacitor C6, and the other terminal of the resistor R50, respectively.

As can be seen from above embodiments, the module with the function of remotely controlling dimming and color temperature adjusting is compatible with an inductive dimming module in the market, which can rapidly achieve the dimming and color temperature control of an LED-driven lamp in an alternate way. Correspondingly, the LED driver needs to reserve a color temperature driving interface and a color temperature conversion driving circuit. A single-chip microcomputer is used for intelligent control of brightness and color temperature adjustment, which can be used for long-distance control or remote wireless control. The long-distance control includes an infrared remote control (RF), and the remote wireless control includes a Bluetooth remote control and a WiFi remote control. The single-chip microcomputer can be configured to adjust the corresponding brightness and color temperature according to received remote control information. The dimming and color temperature adjusting module is upgraded from a standard inductor in the current market, which makes a customer have another choice between dimming and color temperature adjusting. Meanwhile, the modules and interfaces become standardized, thus facilitating production and maintenance.

Embodiment 2

The difference between Embodiment 2 and Embodiment 1 is that Embodiment 2 specifically differs from the embodiment is as follows: the color temperature conversion driving circuit is driven by a power source in Embodiment 2 instead of manual dip switch. On the basis of the standard 12 AUX, DIM+ and DIM− pins, the output interface circuit is additionally provided with W− and C− to achieve common interfaces with the existing general inductor. However, the addition of W− and C− is not required in Embodiment 1, and the auxiliary circuit is directly used for driving.

Referring to FIG. 11 through FIG. 16, a dimming and color temperature adjusting control module is provided by the present disclosure, including a PWM-to-0-10V dimming circuit II 601, a MUC main control circuit II 101, an infrared receiving circuit II 701, a power supply circuit II 801, a wireless communication module II 501, and a dimming and color temperature adjusting interface circuit 201.

The MUC main control circuit II 101 is correspondingly and electrically connected to corresponding terminals of the PWM-to-0-10V dimming circuit II 601, the infrared receiving circuit II 701, the wireless communication module II 501 and the dimming and color temperature adjusting interface circuit 201, respectively.

The power supply circuit II 801 is configured to supply power to the MUC main control circuit II 101, the infrared receiving circuit II 701, and the wireless communication module II 501.

The dimming and color temperature adjusting interface circuit 201 is electrically connected to a color temperature conversion driving circuit 401 with a built-in external power supply.

Figure 11:
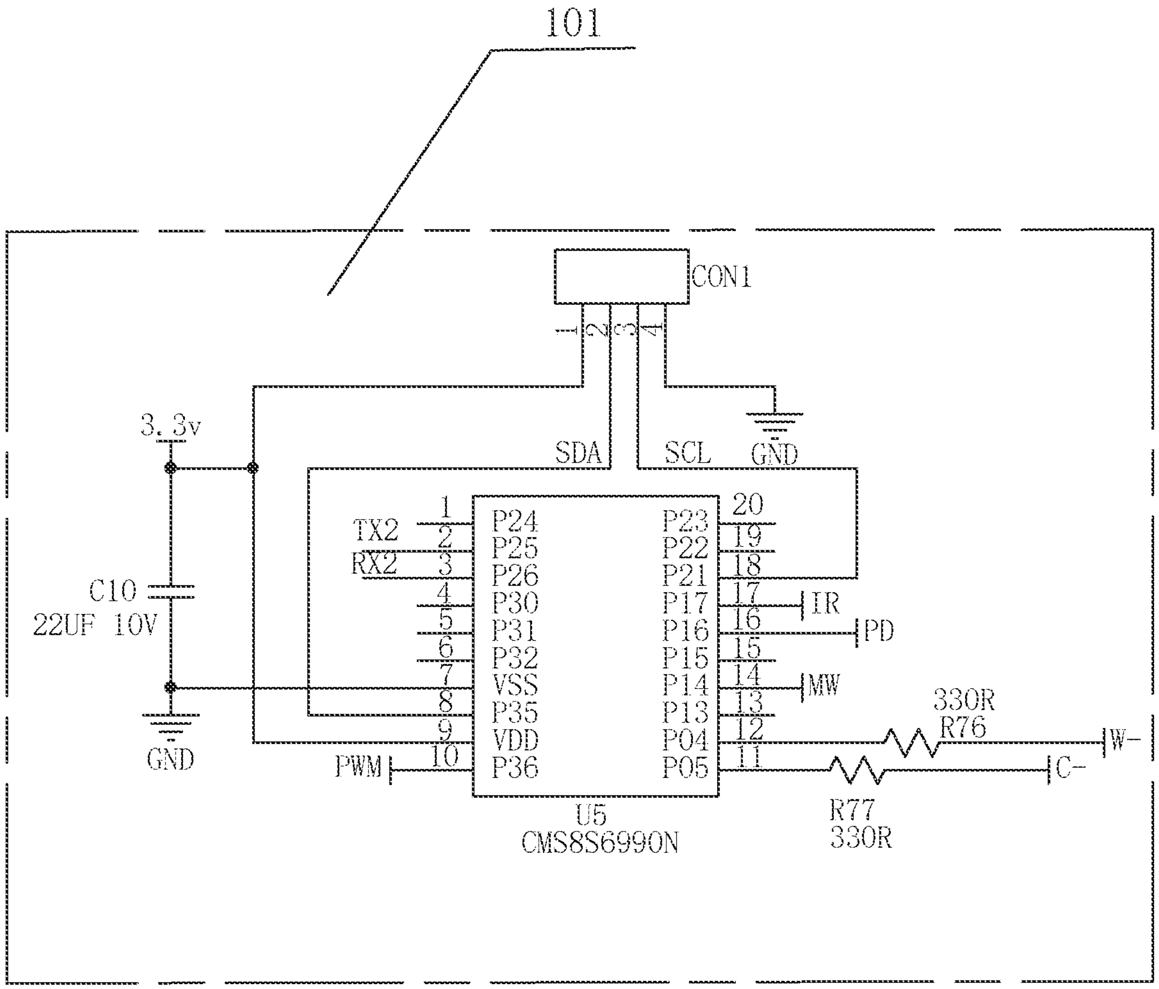
FIG. 11 is a schematic diagram of a MUC main control circuit II according to Embodiment 2 of the present disclosure.
Figure 12:
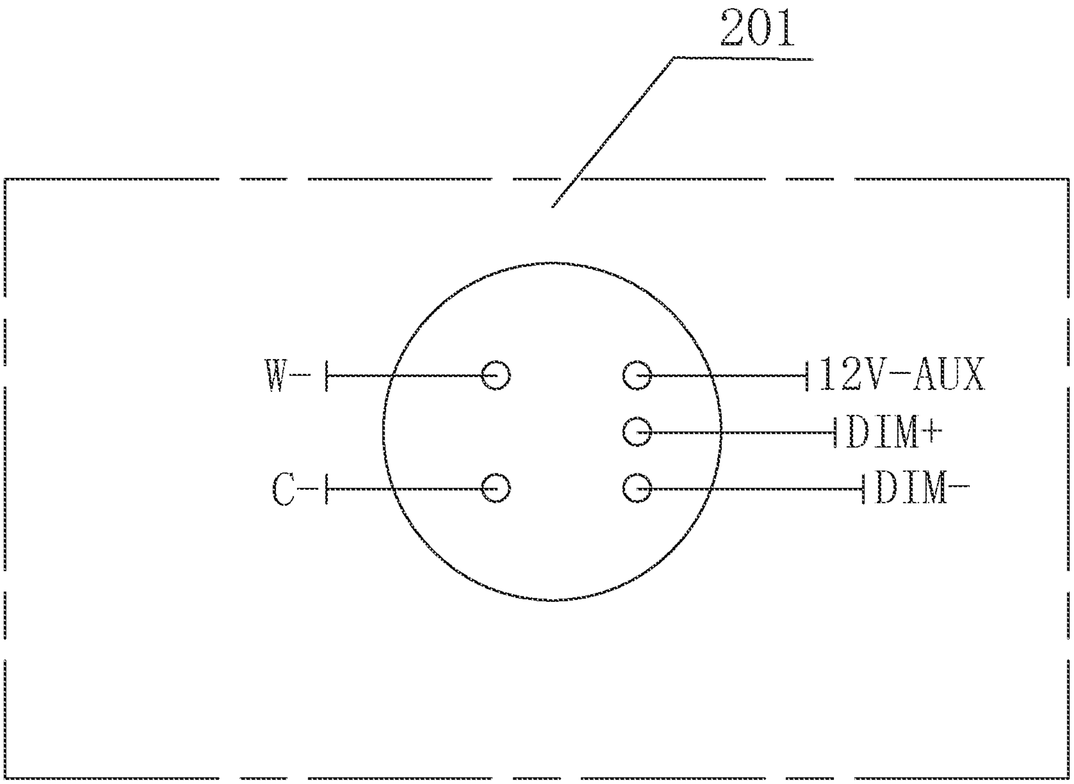
FIG. 12 is a schematic circuit diagram of a dimming and color temperature adjusting interface according to Embodiment 2 of the present disclosure.

Referring to FIG. 11, the MUC main control circuit II 101 in this embodiment is a single-chip microcomputer CMS8S6990N, CON1 is a burning PIN connected to a pin 9 VDD, a pin 8 SDA, and a pin 18 SCL, and a ground pin GND. 10 is the PWM output for adjusting the power of LED drive, that is, dimming. Three levels, i.e., 0&1, 1&0 and 1&1, are output by a pin 12 W− and a pin 11 C− for driving an optocoupler, so as to achieve color temperatures of 3000 K, 5000 K and 4000 K under the action of the color temperature conversion driving circuit. A pin 2 TX2 and a pin 3 RX2 are configured to receive and decode RXTX serial communication signals transmitted from a Bluetooth module, so as to achieve wireless communication. Meanwhile, a pin 17 is reserved as an IR infrared input interface for receiving and decoding an infrared signal, a pin 16 is a light-sensing input for preferably processing light complementation and light sensing. A pin 14 MW is a microwave induction input for processing a microwave induction signal. The MUC main control circuit includes a CMS8S6990N chip and a peripheral circuit thereof.

Figure 13:
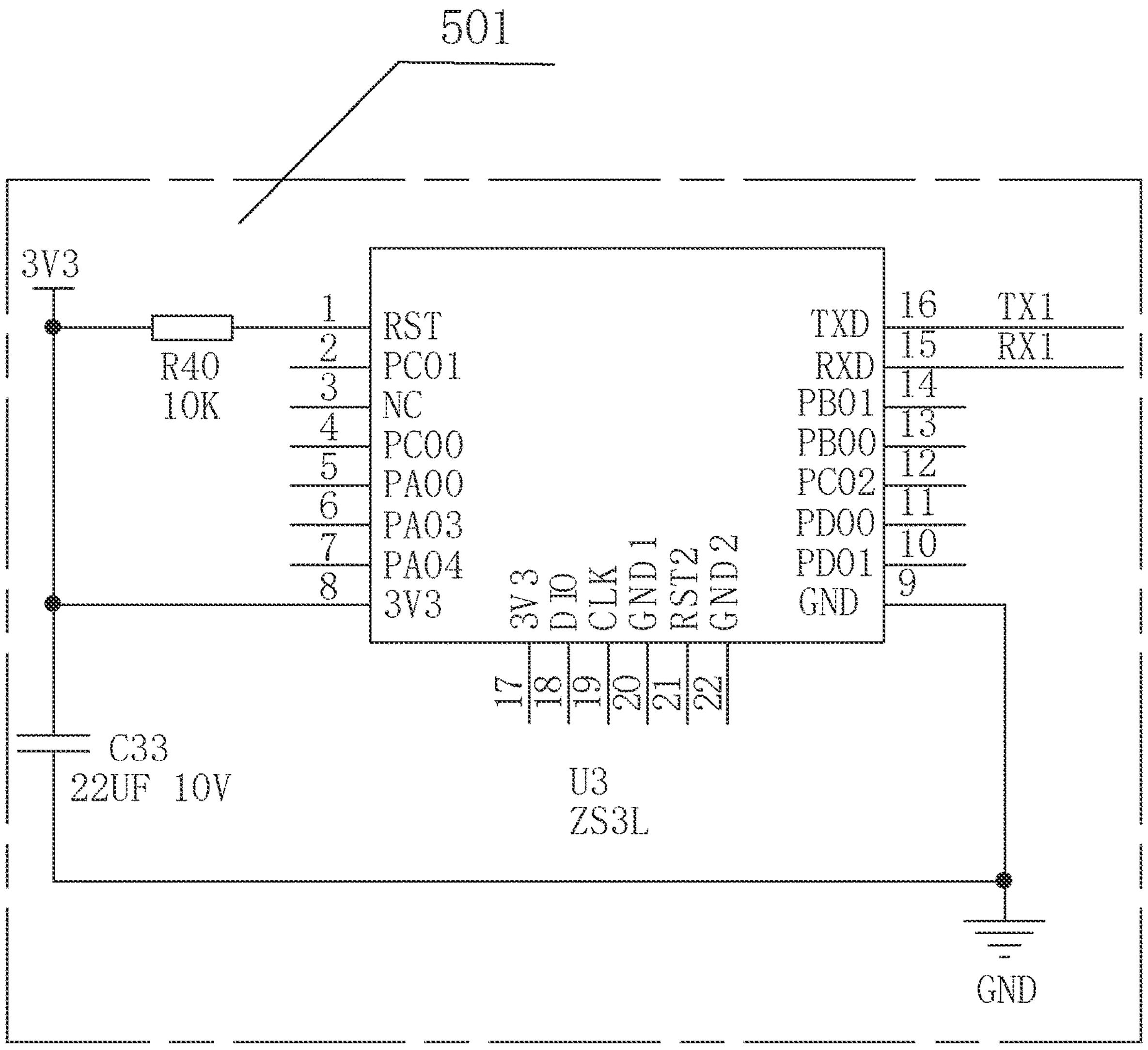
FIG. 13 is a schematic circuit diagram of a wireless communication module II according to Embodiment 2 of the present disclosure.

Referring to FIG. 13, the wireless communication module II 501 in this embodiment is a wireless Bluetooth module. A chip of the wireless Bluetooth module is ZS3L U3. After a pin 8 is powered with 3.3 V, R40 is reset, and an IC module enters into operation. After matching with a mobile phone APP, serial communications RX and TX communicate with the MCU to achieve wireless remote-control setting. The wireless communication module is one of a wireless Bluetooth module, a WIFI module, a 2G module, a 3G module, a 4G module and a 5G module.

Figure 14:
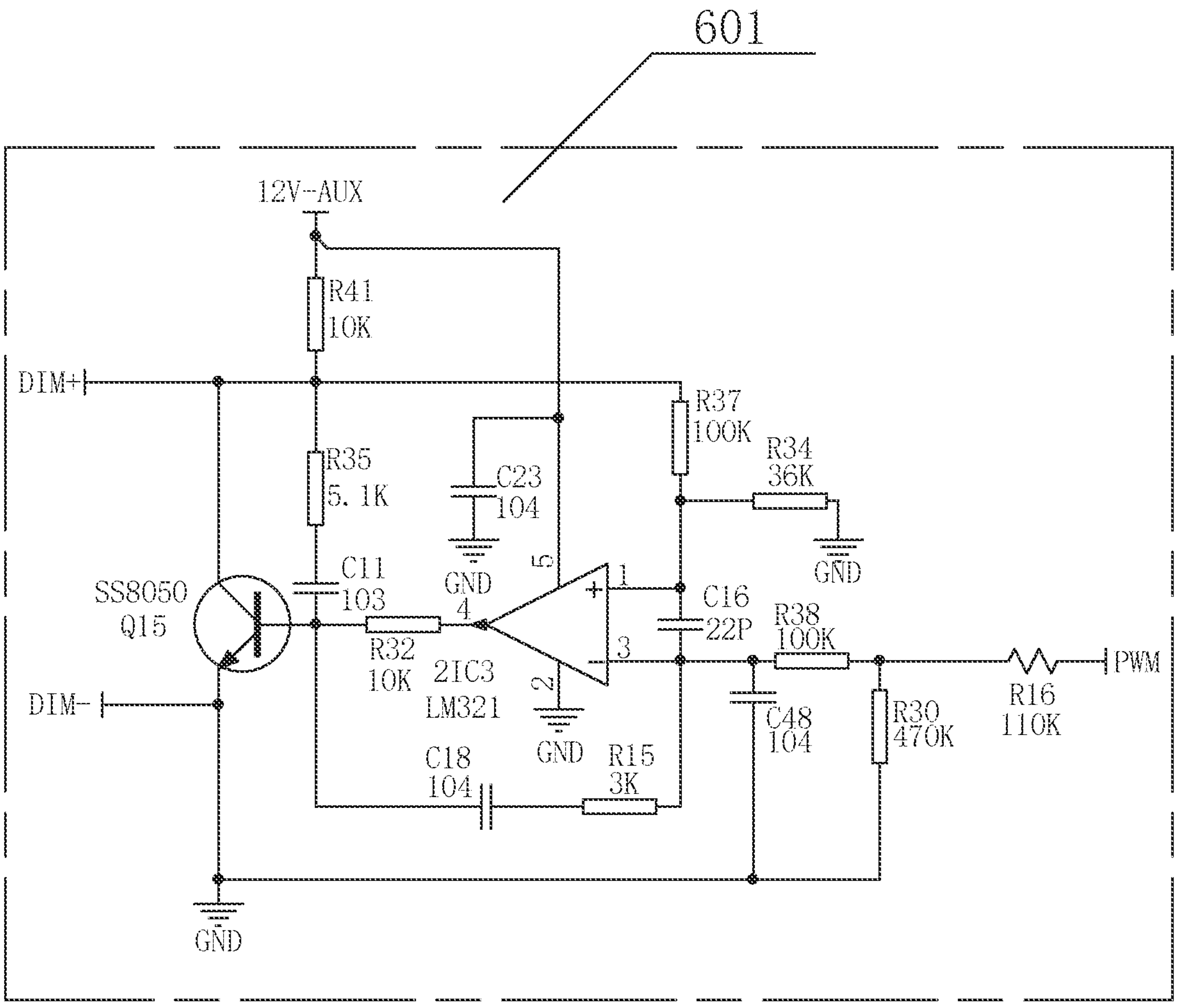
FIG. 14 is a schematic circuit diagram of a PWM-to-0-10V dimming circuit II according to Embodiment 2 of the present disclosure.

Referring to FIG. 14, the PWM-to-0-10V dimming circuit II 601 is as follows: a pulse with an adjustable duty ratio of 0-100% output by 3.3 V is divided into 2.5 V via R16 and R30 and sent to a pin 3 of 2IC3 LM321. LM321 is linearly amplified by 4 times via R37 and R34, and an analog voltage of 0-10V is output at a pin 4 to push Q15 to pull DIM+, that is, a dimming voltage of a LED driver may vary from 0 V to 10 V, so as to achieve dimming and power adjusting. The PWM-to-0-10V dimming circuit includes a resistor R16, a resistor R15, a resistor R32, a resistor R30, a resistor R34, a resistor R35, a resistor R37, a resistor R38, a resistor R41, a capacitor C11, a capacitor C16, a capacitor C18, a capacitor C48, a capacitor C23, a triode Q15, and an operational amplifier LM321. A positive electrode of the operational amplifier LM321 is electrically connected to one terminal of the resistor R34, one terminal of the resistor R37, and one terminal of the capacitor C16, respectively. A negative electrode of the operational amplifier LM321 is electrically connected to the other terminal of the capacitor C16, one terminal of the resistor R15, one terminal of the capacitor C48, and one terminal of the resistor R38, respectively. An output of the operational amplifier LM321 is electrically connected to a one terminal of the capacitor C11, one terminal of the capacitor C18, and a first terminal of the triode Q15 via one terminal of the resistor R32, respectively. A fifth terminal of the operational amplifier LM321 is electrically connected to one terminal of the resistor R41, and one terminal of the capacitor C23, respectively, and the other terminal of the capacitor C23 and the other terminal of the resistor R34 are grounded. The other terminal of the resistor R37 is electrically connected to one terminal of the resistor R35 and a second terminal of the triode Q15, respectively, and the other terminal of the resistor R15 is electrically connected to the other terminal of the capacitor C18. The other terminal of the capacitor C48 is electrically connected to one terminal of the resistor R30 and a third terminal of the triode Q15 respectively and is grounded, the other terminal of the resistor R30 is electrically connected to the other terminal of the resistor R38 and one terminal of the resistor R16, respectively, and the other terminal of the resistor R16 is electrically connected to a corresponding terminal of the CMS8S6990N chip. The other terminal of the resistor R35 is electrically connected to the other terminal of the capacitor C11.

Figure 15:
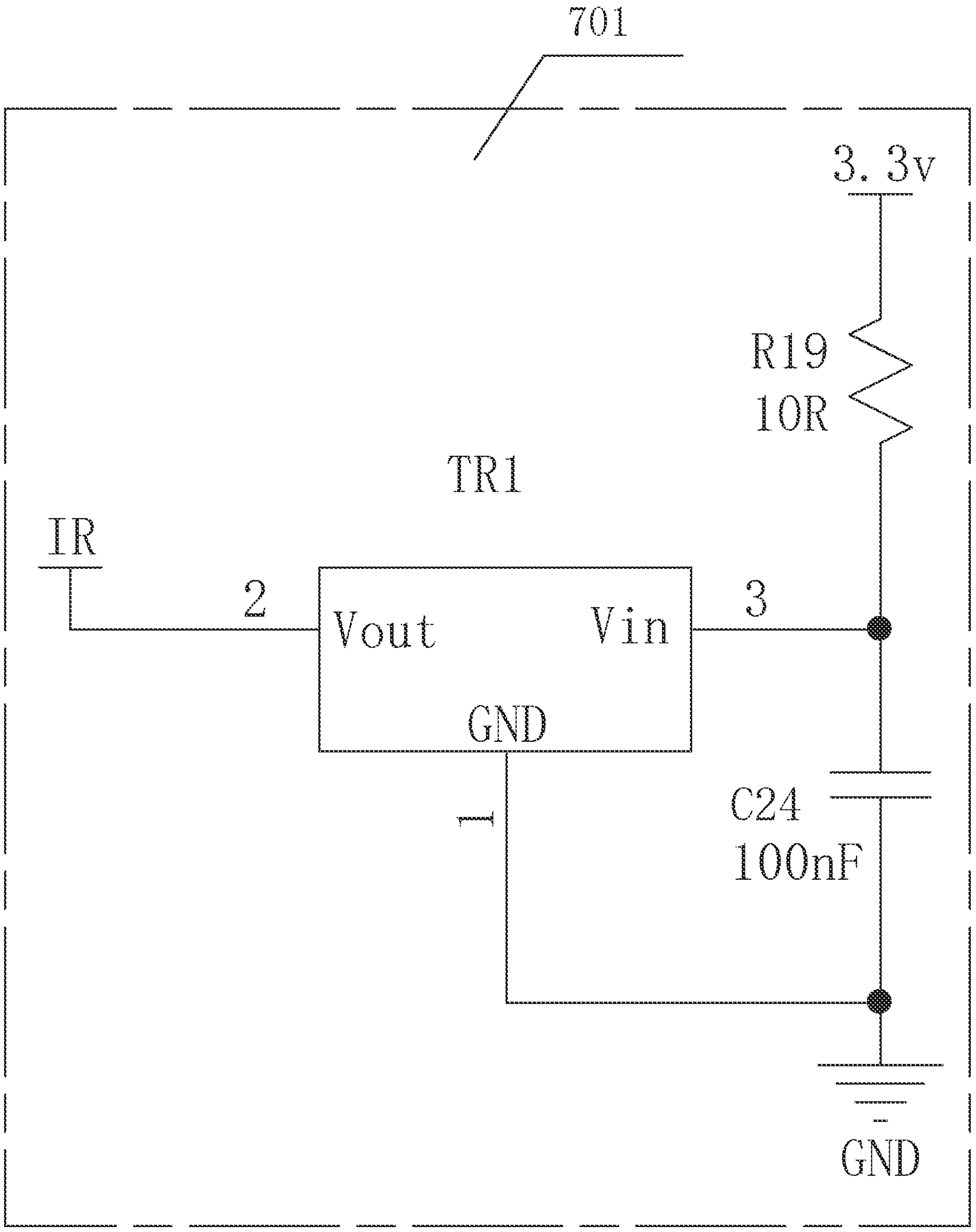
FIG. 15 is a schematic circuit diagram of an infrared receiving circuit II according to Embodiment 2 of the present disclosure.

Referring to FIG. 15, the function of the infrared receiving circuit II 701 in this embodiment is to receive an infrared signal transmitted from an infrared remote controller, and to transmit the infrared signal to a pin 16 of the MUC via the pin 2 for value-building decoding processing, and the pin 3 is Vin which is configured to supply power to an infrared receiving module after the filtration of C24.

Figure 16:
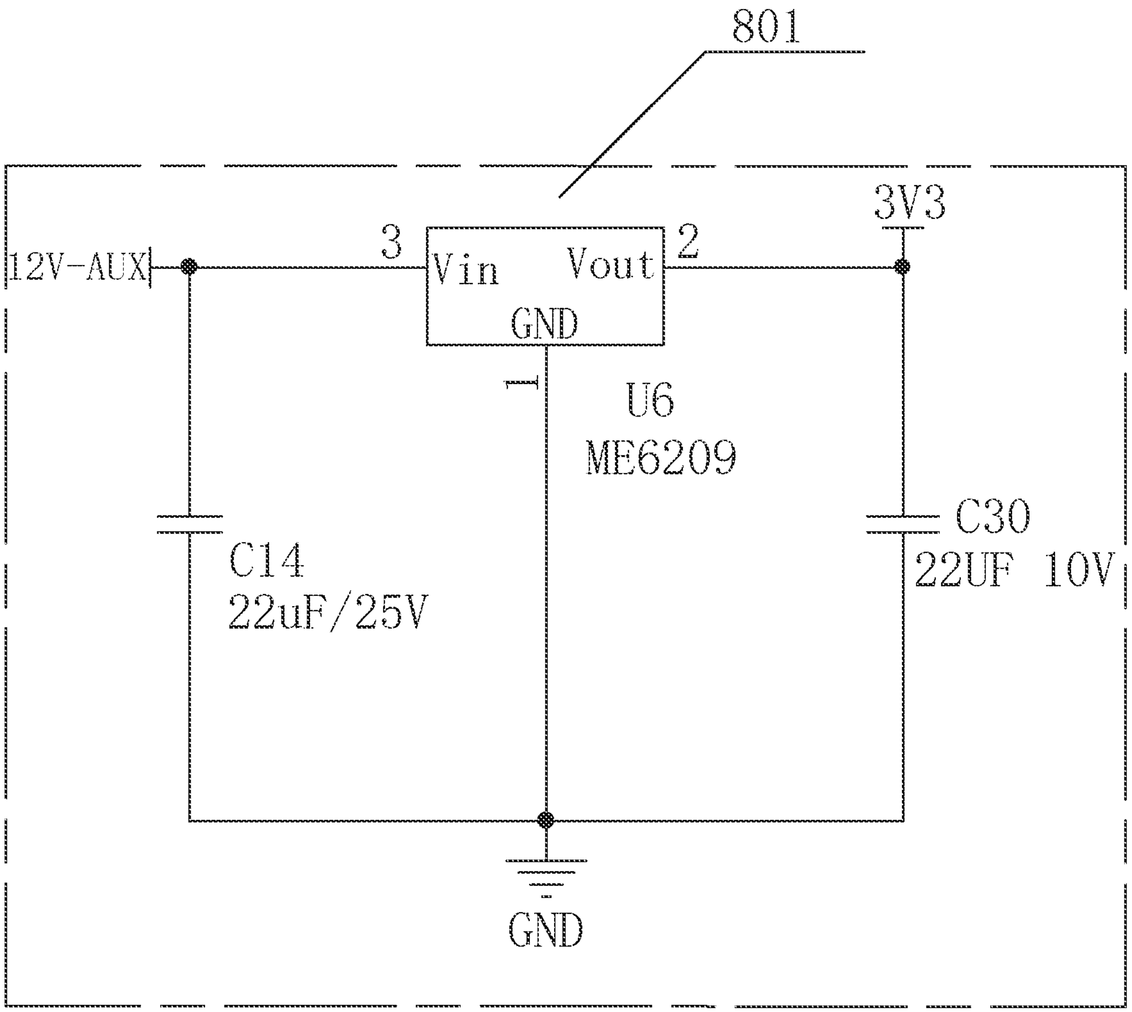
FIG. 16 is a schematic circuit diagram of a power supply circuit II according to Embodiment 2 of the present disclosure.

Referring to FIG. 16, the power supply circuit II 801 in this embodiment further includes a resistor R19 and a capacitor C14. 12-AUX is reduced to 3.3 V via U6 ME6209 after being is filtered via the C14, and then is filtered via C30, so as to provide stable power supply for the MCU and the Bluetooth module. The power supply circuit includes a voltage regulator chip ME6209 and a peripheral circuit thereof, which are configured to convert an input voltage of 12 V into 3.3 V, so as to supply power to the circuit.

As can be seen from above Embodiments 1 and 2, the module with the function of remotely controlling dimming and color temperature adjusting is compatible with an inductive dimming module in the market, which can rapidly achieve the dimming and color temperature control of an LED-driven lamp in an alternate way. Correspondingly, the LED driver needs to reserve a color temperature driving interface and a color temperature conversion driving circuit. A single-chip microcomputer is used for intelligent control of brightness and color temperature adjustment, which can be used for long-distance control or remote wireless control. The long-distance control includes an infrared remote control (RF), and the remote wireless control includes a Bluetooth remote control and a WiFi remote control. The single-chip microcomputer can be configured to adjust the corresponding brightness and color temperature according to received remote control information. The dimming and color temperature adjusting module is upgraded from a standard inductor in the current market, which makes a customer have another choice between dimming and color temperature adjusting. Meanwhile, the modules and interfaces become standardized, thus facilitating production and maintenance.

The above is only the preferred embodiments of the present disclosure and is not intended to limit the patent scope of the present disclosure. Under the inventive concept, any equivalent structure or modification used according to the contents of the specification and drawings in the present disclosure, no matter whether it is directly or indirectly used in any other related technical field should be included within the protection scope of the present disclosure.

What is claimed is:

1. A dimming and color temperature adjusting control module, comprising a pulse width modulation (PWM)-to-0-10V dimming circuit, a microcontroller unit (MUC) main control circuit, an infrared receiving circuit, a power supply circuit, a wireless communication module, an output interface circuit, a color temperature conversion driving circuit, and an auxiliary power supply circuit;

corresponding terminals of the MUC main control circuit are electrically connected to corresponding terminals of the PWM-to-0-10V dimming circuit, the infrared receiving circuit, the wireless communication module and the color temperature conversion driving circuit, respectively;

a corresponding terminal of the color temperature conversion driving circuit is electrically connected to a corresponding terminal of the output interface circuit;

the power supply circuit is configured to output a voltage of 3.3 V, so as to supply power to the MUC main control circuit, the wireless communication module and the infrared receiving circuit; and the auxiliary power supply circuit is configured to output a voltage of 12 V, so as to supply power to the color temperature conversion driving circuit.

2. The dimming and color temperature adjusting control module according to claim 1, wherein the MUC main control circuit comprises a CMS8S6990N chip and a peripheral circuit thereof.

3. The dimming and color temperature adjusting control module according to claim 1, wherein the PWM-to-0-10V dimming circuit comprises a resistor R16, a resistor R15, a resistor R32, a resistor R30, a resistor R34, a resistor R35, a resistor R37, a resistor R38, a resistor R41, a capacitor C11, a capacitor C16, a capacitor C18, a capacitor C48, a capacitor C23, a triode Q15, and an operational amplifier LM321; a positive electrode of the operational amplifier LM321 is electrically connected to one terminal of the resistor R34, one terminal of the resistor R37, and one terminal of the capacitor C16; a negative electrode of the operational amplifier LM321 is electrically connected to the other terminal of the capacitor C16, one terminal of the resistor R15, one terminal of the capacitor C48, and one terminal of the resistor R38, respectively; an output of the operational amplifier LM321 is electrically connected to one terminal of the capacitor C11, one terminal of the capacitor C18, and a first terminal of the triode Q15 via one terminal of the resistor R32, respectively; a fifth terminal of the operational amplifier LM321 is electrically connected to one terminal of the resistor R41 and one terminal of the capacitor C23, respectively, and the other terminal of the capacitor C23 and the other terminal of the resistor R34 are grounded; the other terminal of the resistor R37 is electrically connected to one terminal of the resistor R35 and a second terminal of the triode Q15, respectively, and the other terminal of the resistor R15 is electrically connected to the other terminal of the capacitor C18; the other terminal of the capacitor C48 is electrically connected to one terminal of the resistor R30 and a third terminal of the triode Q15 respectively and is grounded; the other terminal of the resistor R30 is electrically connected to the other terminal of the resistor R38 and one terminal of the resistor R16, respectively, the other terminal of the resistor R16 is electrically connected to a corresponding terminal of the CMS8S6990N chip, and the other terminal of the resistor R35 is electrically connected to the other terminal of the capacitor C11.

4. The dimming and color temperature adjusting control module according to claim 1, wherein the power supply circuit comprises a voltage regulator chip ME6209 and a peripheral circuit thereof, which is configured to convert an input voltage of 12 V into 3.3 V, so as to supply power to the MUC main control circuit, the wireless communication module and the infrared receiving circuit.

5. The dimming and color temperature adjusting control module according to claim 4, wherein the wireless communication module is one of a wireless Bluetooth module, a WIFI module, a 2G module, a 3G module, a 4G module, and a 5G module.

6. The dimming and color temperature adjusting control module according to claim 1, wherein the auxiliary power supply circuit comprises a flyback control chip JW3510, a transformer, a resistor R1, a resistor R2, a resistor R3, a resistor R8, a resistor R50, a capacitor C1, a capacitor C5, a capacitor C6, a capacitor C7, a capacitor C8, a diode D1, a diode D2, and an inductor F1; one terminal of the inductor F1 is connected to a 12V-AUX terminal, and the other terminal of the inductor F1 is electrically connected to one terminal of the capacitor C7, one terminal of the resistor R1, a fifth terminal of the flyback control chip JW3510, one terminal of the capacitor C1, one terminal of the resistor R2, and one terminal of the transformer, respectively; the other terminal of the capacitor C7 is electrically connected to one terminal of the resistor R3, a second terminal of the flyback control chip JW3510 and one terminal of the capacitor C8, respectively; the other terminal of the resistor R1 is electrically connected to a first terminal of the flyback control chip JW3510 and the other terminal of the resistor R3, respectively; a fourth terminal of the flyback control chip JW3510 is electrically connected to one terminal of the diode D1, a corresponding terminal of the transformer, and one terminal of the resistor R8, respectively; the other terminal of the diode D1 is electrically connected to the other terminal of the capacitor C1 and the other terminal of the resistor R2, respectively; a third terminal of the flyback control chip JW3510 is electrically connected to the other terminal of the capacitor C8, and the other terminal of the resistor R8, respectively; the corresponding terminals of the transformer are electrically connected to one terminal of the diode D2, one terminal of the capacitor C5, one terminal of the capacitor C6, and one terminal of the resistor R50, respectively, and the other terminal of the diode D2 is electrically connected to the other terminal of the capacitor C5, the other terminal of the capacitor C6, and the other terminal of the resistor R50, respectively.

7. The dimming and color temperature adjusting control module according to claim 1, wherein the color temperature conversion driving circuit comprises a metal oxide semiconductor (MOS) transistor Q2, a MOS transistor Q5, a triode Q1, a triode Q3, a triode Q4, a triode Q6, a phototriode I, a phototriode II, a diode ZD2, a diode ZD3, a resistor R13, a resistor R14, a resistor R17, a resistor R18, a resistor R20, a resistor R21, a resistor R23, a resistor R24, a resistor R25, a resistor R26, a resistor R27, a resistor R28, a resistor R29, a resistor R31, and a capacitor C22;

a gate of the MOS transistor Q2 is electrically connected to one terminal of the resistor R17, one terminal of the resistor R23, one terminal of the diode ZD2, and one terminal of the resistor R25, respectively, and a source of the MOS transistor Q2 is electrically connected to the other terminal of the resistor R25, the other terminal of the diode ZD2, a first terminal of the triode Q3, a first terminal of the triode Q6, one terminal of the diode ZD3, one terminal of the resistor R24 and a source of the MOS transistor Q5, respectively; the other terminal of the resistor R23 is electrically connected to a corresponding terminal of the output interface circuit and one terminal of the resistor R27 via the resistor R29 and the resistor R26, respectively; the other terminal of the resistor R17 is electrically connected to a first terminal of the triode Q1 and a second terminal of the triode Q3, respectively; a second terminal of the triode Q1 is electrically connected to one terminal of the resistor R18 and a third terminal of the transistor Q3, respectively, and a third terminal of the triode Q1 is electrically connected to one terminal of the resistor R13, one terminal of the capacitor C22, one terminal of the phototriode I, and one terminal of the phototriode II via the resistor R14, respectively; the other terminal of the resistor R18 is electrically connected to the other terminal of the phototriode I, the other terminal of the phototriode II is electrically connected to a first terminal of the triode Q4 and a second terminal of the triode Q6 via the resistor R21, respectively; a gate of the MOS transistor Q5 is electrically connected to one terminal of the resistor R28, one terminal of the resistor R20, the other terminal of the diode ZD3 and the other terminal of the resistor R24, respectively; the other terminal of the resistor R20 is electrically connected to a second terminal of the triode Q4 and a third terminal of the triode Q6, respectively; a third terminal of the triode Q4 is electrically connected to the other terminal of the resistor R13, and the other terminal of the resistor R28 is electrically connected to the other terminal of the resistor R27 via the resistor R31.

* * * * *